United States Patent
Sato et al.

(10) Patent No.: US 8,074,001 B2
(45) Date of Patent: Dec. 6, 2011

(54) INFORMATION PROCESSING APPARATUS, KVM SWITCH, REMOTE SYSTEM, AND COMPUTER READABLE STORAGE MEDIUM

(75) Inventors: Yu Sato, Shinagawa (JP); Naoyuki Nagao, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 240 days.

(21) Appl. No.: 12/461,617

(22) Filed: Aug. 18, 2009

(65) Prior Publication Data

US 2010/0049889 A1 Feb. 25, 2010

(30) Foreign Application Priority Data

Aug. 19, 2008 (JP) .................... 2008-211234

(51) Int. Cl.
G06F 13/12 (2006.01)
G06F 3/00 (2006.01)
(52) U.S. Cl. ................ 710/73; 710/8; 710/14
(58) Field of Classification Search .......... None
See application file for complete search history.

(56) References Cited

U.S. PATENT DOCUMENTS

| | | | | |
|---|---|---|---|---|
| 6,671,756 B1 * | 12/2003 | Thomas et al. | ............... | 710/73 |
| 7,496,697 B2 * | 2/2009 | Sween et al. | ............... | 710/38 |
| 2008/0147922 A1 * | 6/2008 | Chou | ............... | 710/62 |

FOREIGN PATENT DOCUMENTS

| | | |
|---|---|---|
| JP | 2003-534685 | 11/2003 |
| WO | 01/84291 A1 | 11/2001 |

\* cited by examiner

*Primary Examiner* — Alan Chen
(74) *Attorney, Agent, or Firm* — Staas & Halsey LLP (57) ABSTRACT

An information processing apparatus includes a selection portion that selects any one of a first setting that enables data on a hot key from a keyboard for a server, a second setting that enables the data on the hot key from the keyboard for a KVM switch, and a third setting that disables the data on the hot key from the keyboard for both of the KVM switch and the server; and a transmission portion that transmits the data on the hot key and a flag indicating the first setting to the server when the first setting is selected, transmits the data on the hot key and a flag indicating the second setting to the KVM switch when the second setting is selected, and fails to transmit the data on the hot key to the KVM switch and the server when the third setting is selected.

10 Claims, 10 Drawing Sheets

| TYPE OF HOT KEY | OPERATION OF SERVER |
|---|---|
| DEPRESSION OF "CTRL" KEY TWICE | OUTPUT OF SERVER SELECTION SCREEN |
| DEPRESSION OF "F1" KEY TWICE | START-UP OF APPLICATION |
| ⋮ | ⋮ |

FIG. 3B

| TYPE OF HOT KEY | OPERATION OF KVM SWITCH |
|---|---|
| DEPRESSION OF "CTRL" KEY TWICE | OUT PUT OF MENU SCREEN |
| DEPRESSION OF "F1" KEY TWICE | SWITCH OF SERVER |
| ⋮ | ⋮ |

INFORMATION PROCESSING APPARATUS, KVM SWITCH, REMOTE SYSTEM, AND COMPUTER READABLE STORAGE MEDIUM

CROSS-REFERENCE TO RELATED APPLICATION

This application is based upon and claims the benefit of priority from prior Japanese Patent Application No. 2008-211234 filed on Aug. 19, 2008, the entire contents of which are incorporated herein by reference.

BACKGROUND OF THE INVENTION

1. Field of the Invention

The present invention relates to an information processing apparatus connected to a server via a KVM (K: Keyboard, V: Video, M: Mouse) switch, as well as a KVM switch, a remote system, and a computer readable medium.

2. Description of the Related Art

Conventionally, there has been known a system including a plurality of clients, a plurality of servers, and a KVM switch switching the communication between the clients and the servers (see Japanese Laid-Open Patent Publication No. 2003-534685).

In this type of system, a single client is connected to one of the servers selected by a user via the KVM switch, and a monitor connected to the client can display screen data of the selected server. A user of the client can input a hot key that quickly operates a function included in the server or the KVM switch, from a keyboard connected to the client. When a "Ctrl" key as the hot key is depressed twice, for example, a screen for server selection is displayed on the monitor connected to the client.

However, even when the hot key is input in order to operate any one of the functions included in the server and the KVM switch, there is a case where both of the functions included in the server and the KVM switch operate. Even when the hot key is input in order to operate the function included in the server, there is a case where the function included in the KVM switch only operate. This results in degraded usability of the hot key.

SUMMARY OF THE INVENTION

It is an object of the present invention to provide an information processing apparatus, a KVM switch, a remote system, and a computer readable medium that can improve usability of a hot key.

According to a first aspect of the present invention, there is provided an information processing apparatus including: a selection portion that selects any one of a first setting that enables data on a hot key from a keyboard for a server, a second setting that enables the data on the hot key from the keyboard for a KVM switch, and a third setting that disables the data on the hot key from the keyboard for both of the KVM switch and the server, the information processing apparatus being connected to the server via the KVM switch, and connected to the keyboard; and a transmission portion that transmits the data on the hot key and a flag indicative of the first setting to the server via the KVM switch when the first setting is selected, transmits the data on the hot key and a flag indicative of the second setting to the KVM switch when the second setting is selected, and fails to transmit the data on the hot key to the KVM switch and the server when the third setting is selected.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, of an embodiment of the present invention.

Figure 1:
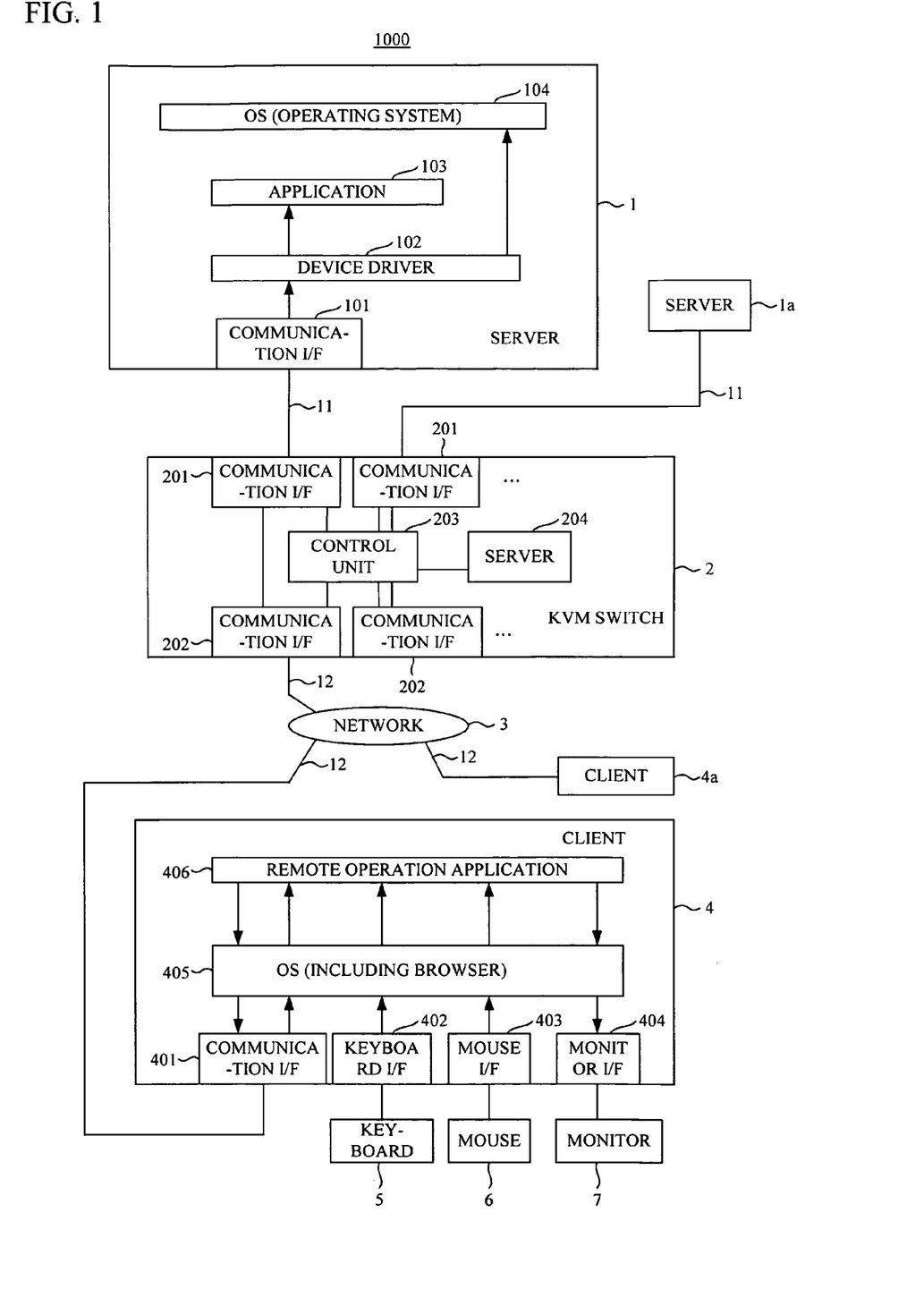
FIG. 1 is a schematic diagram showing the construction of a remote system including an information processing apparatus according to a present embodiment.

FIG. 1 is a schematic diagram showing the construction of a remote system including an information processing apparatus according to a present embodiment.

In FIG. 1, a remote system 1000 includes servers 1 and 1a, a KVM switch 2, and clients 4 and 4a as an information processing apparatus. The servers 1 and 1a are connected to the KVM switch 2 via the serial cables 11. The clients 4 and 4a are connected to the KVM switch 2 via a network 3 and LAN cables 12. The server 1 has the same construction and functions as the server 1a, and hence a description will be given of the server 1. Similarly, the client 4 has the same construction and functions as the client 4a, and hence a description will be given of the client 4.

The server 1 includes: a communication interface (I/F) 101 to which the serial cable 11 is connected; a device driver 102 that extracts operation data of a keyboard 5 or a mouse 6 from a packet received from the KVM switch 2; and an application 103 and an operating system (OS) 104 that execute predetermined processes based on operation data received from the device driver 102. Although the OS 104 is any one of Windows (registered trademark), UNIX (registered trademark), and MAC OS, Windows is mainly used for the present embodiment.

The KVM switch 2 includes: a communication interface (I/F) 201 that receives screen data from the server 1 via the serial cable 11, and transmits the packet including the operation data of the keyboard 5 or the mouse 6 to the server 1; a communication interface (I/F) 202 that receives the operation data of the keyboard 5 or the mouse 6 from the client 4, and transmits the screen data from the server 1 to the client 4; a control unit 203 (a selection portion, and a control portion) that executes various processes, and controls the entire KVM switch 2 including the communication I/Fs 201 and 202; and a memory 204 that stores various data. The control unit 203 is composed of a microcomputer, and a memory 204 is composed of a hard disk drive or a nonvolatile memory. The KVM switch 2 is an IP-KVM switch that communicates with the client 4, and the operation data of the keyboard 5 or the mouse 6 and the screen data from the server 1 are received and transmitted as data of an IP packet.

The number of the communication I/Fs 201 and 202 is not limited to one, and there may be a plurality of communication I/Fs 201 and 202.

The client 4 includes: a communication interface (I/F) 401 that transmits the operation data of the keyboard 5 or the mouse 6 to the KVM switch 2 via the network 3, and receives the screen data of the server 1 from the KVM switch 2 via the network 3; a keyboard I/F 402 that receives keyboard data from the keyboard 5; a mouse I/F 403 that receives mouse data from the mouse 6; a monitor I/F 404 that outputs the screen data of the server 1 to a monitor 7, an OS 405 that includes a plurality of device drivers controlling the keyboard 5, the mouse 6, and the monitor 7; a remote operation application 406 (a selection portion and a setting portion) that causes the monitor 7 to display the screen data of the server 1, and causes a user to execute a remote operation. The operation data is composed of the keyboard data from the keyboard 5 and the mouse data from the mouse 6.

The OS 405 receives the screen data of the server 1 from the communication I/F 401, and outputs the screen data to the remote operation application 406. The OS 405 also receives the keyboard data from the keyboard I/F 402, and outputs the keyboard data to the remote operation application 406. Further, the OS 405 receives the mouse data from the mouse I/F 403, and outputs the mouse data to the remote operation application 406. The OS 405 includes a browser.

Figure 2A:
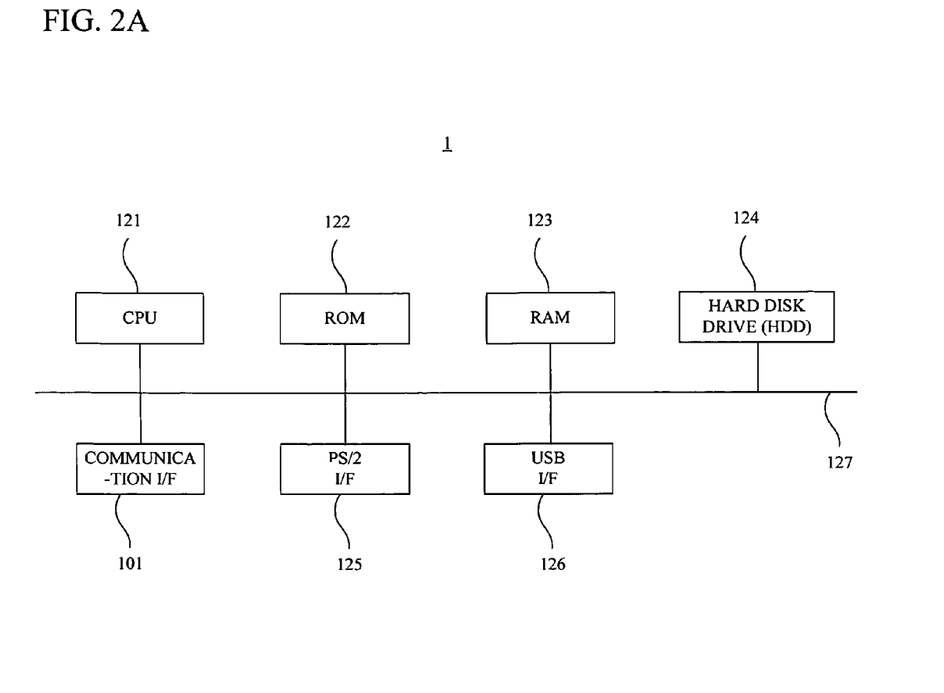
FIG. 2A is a block diagram showing the hardware construction of a server 1.
Figure 2B:
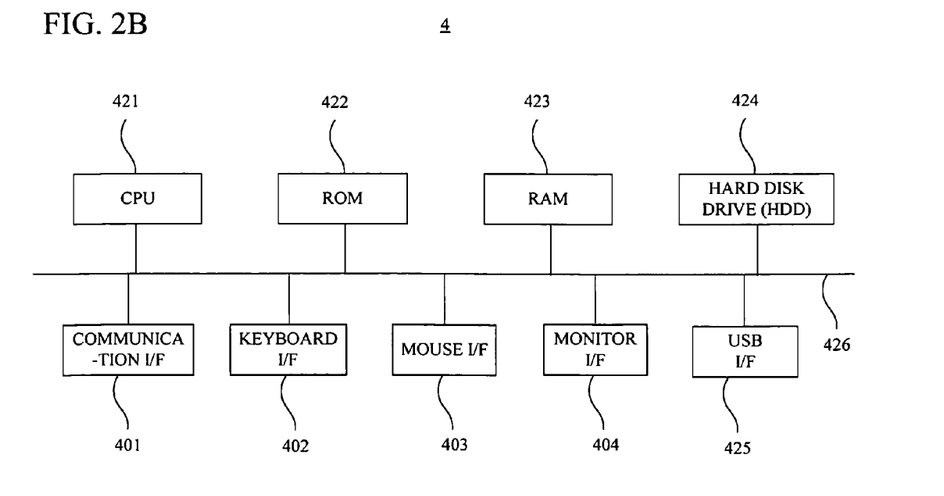
FIG. 2B is a block diagram showing the hardware construction of a client 4.

FIG. 2A is a block diagram showing the hardware construction of the server 1, and FIG. 2B is a block diagram showing the hardware construction of the client 4.

The server 1 includes: the communication I/F 101; a CPU 121 that controls the entire server 1; a ROM 122 that includes a control program; a RAM 123 that functions as a working area; a hard disk drive (HDD) 124 that stores the device driver 102, the application 103, the OS 104, and various information and programs; a PS/2 I/F 125; and a universal serial bus (USB) I/F 126 to which a USB device, not shown is connected. The CPU 121 is connected to the communication I/F 101, the ROM 122, the RAM 123, the HDD 124, the PS/2 I/F 125, and the USB I/F 126 via a system bus 127.

The CPU 121 arbitrarily reads out the device driver 102, the application 103, and the OS 104 from the HDD 124, and execute them, so that processes executed by the device driver 102, the application 103, and the OS 104 are achieved.

The client 4 includes: the communication I/F 401 (a transmission portion, and a reception portion); the keyboard interface (I/F) 402; the mouse I/F 403; the monitor I/F 404; a CPU 421 (a selection portion, the transmission portion, a setting portion, the reception portion, and an update portion) that controls the entire client 4; a ROM 422 that includes a control program; a RAM 423 that functions as a working area; a hard disk drive (HDD) 424 that stores the OS 405 including the browser, the remote operation application 406, and various information and programs; and a USB I/F 425 to which a USB device, not shown, is connected. The CPU 421 is connected to the communication I/F 401, the keyboard interface (I/F) 402, the mouse I/F 403, the monitor I/F 404, the ROM 422, the RAM 423, the HDD 424, and the USB I/F 425.

The CPU 421 arbitrarily reads out the OS 405 and the remote operation application 406, and execute them, so that processes executed by the OS 405 and the remote operation application 406 are achieved.

Figure 3A:
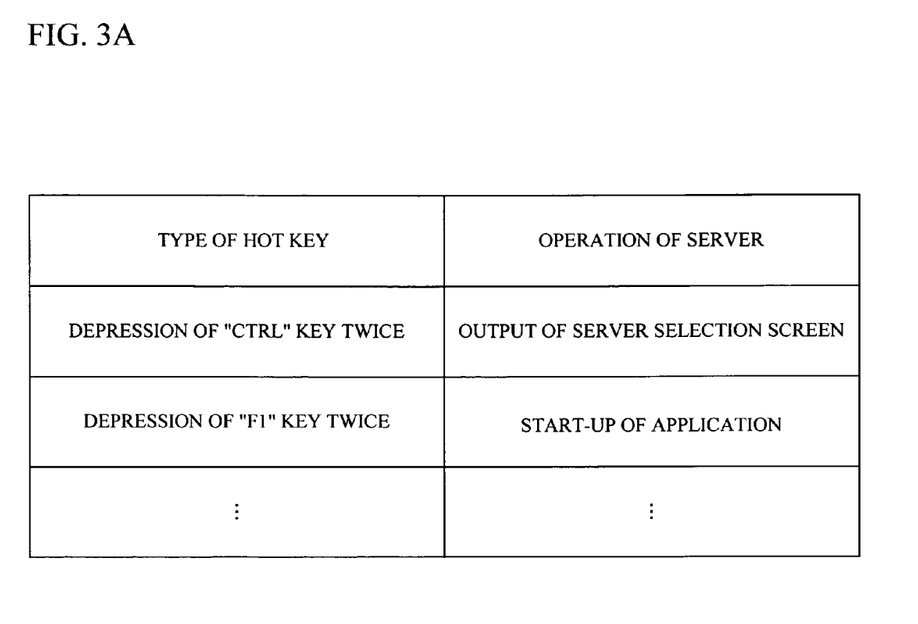
FIG. 3A is a diagram showing table data that defines types of hot keys and operation of the server 1, and is stored into a HDD 124 of the server 1.
Figure 3B:
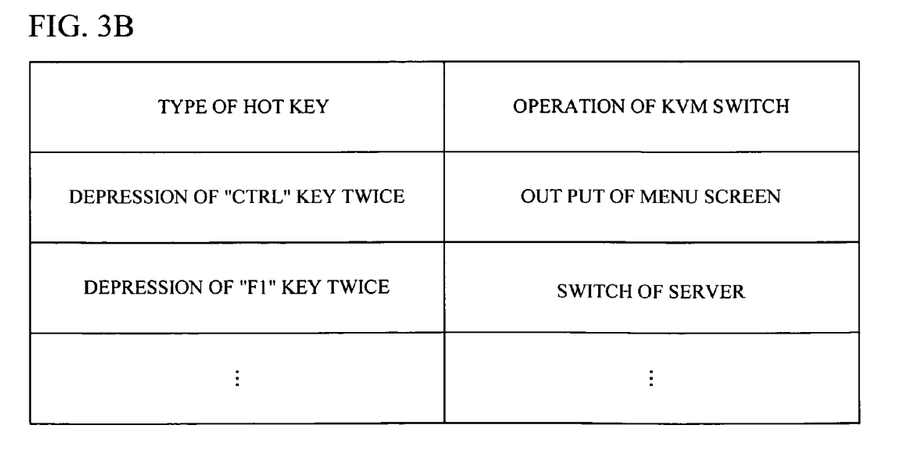
FIG. 3B is a diagram showing table data that defines types of hot keys and operation of the KVM switch 2, and is stored into a memory 204 of the KVM switch 2.

FIG. 3A is a diagram showing table data that defines types of hot keys and operation of the server 1, and is stored into the HDD 124 of the server 1, and FIG. 3B is a diagram showing table data that defines types of hot keys and operation of the KVM switch 2, and is stored into the memory 204 of the KVM switch 2. The hot key indicates functions that executes with easy key operation, a command selected from a menu on the screen with the mouse, and consecutive key operation with high frequency in use, such as input of a specific character string.

In FIG. 3A, when the server 1 receives a packet indicates that a "ctrl" key is depressed twice, from the client 4, the server 1 outputs data on a selection screen of the servers to the monitor 7 of the client 4 via the KVM switch 2. When the server 1 receives a packet indicates that a "F1" key is depressed twice, from the client 4, the server 1 starts up the application 103.

In FIG. 3B, when the KVM switch 2 receives the packet indicates that the "ctrl" key is depressed twice, from the client 4, the KVM switch 2 outputs data on a menu screen to the monitor 7 of the client 4. When the KVM switch 2 receives the packet indicates that the "F1" key is depressed twice, from the client 4 for example, the KVM switch 2 switches a current server to a predetermined server.

The table data of FIGS. 3A and 3B are editable. For example, a user accesses the server 1 with the keyboard 5 and the mouse 6, reads out the table data of FIG. 3A from the HDD 124, to thereby edit the table data.

Figure 4:
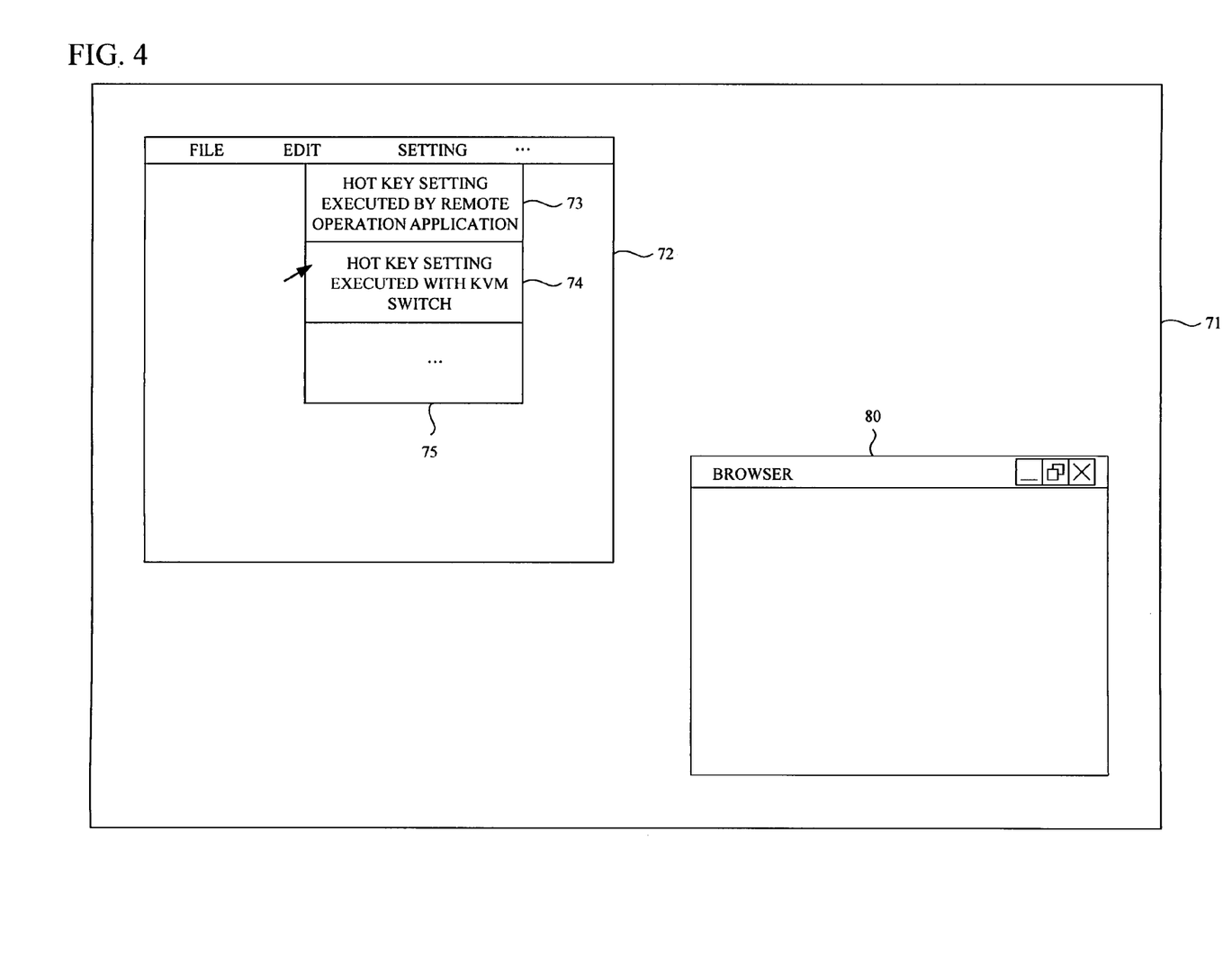
FIG. 4 is a diagram showing an example of a screen of a monitor 7.

FIG. 4 is a diagram showing an example of a screen of the monitor 7.

As shown in FIG. 4, a window 72 of the remote operation application 406 and a window 80 of the browser included in the OS 405 are displayed on a screen 71 of the monitor 7. Image data from the server 1 is displayed on the window 72 of the remote operation application 406. The windows 72 and 80 can be individually displayed on the screen 71. When an item of setting of the window 72 is depressed, a pull-down menu 75 is displayed.

A hot key setting 73 executed by the remote operation application 406, and a hot key setting 74 executed with the KVM switch 2 are displayed on the pull-down menu 75 such that the hot key setting 73 or 74 can be selected.

Figure 5A:
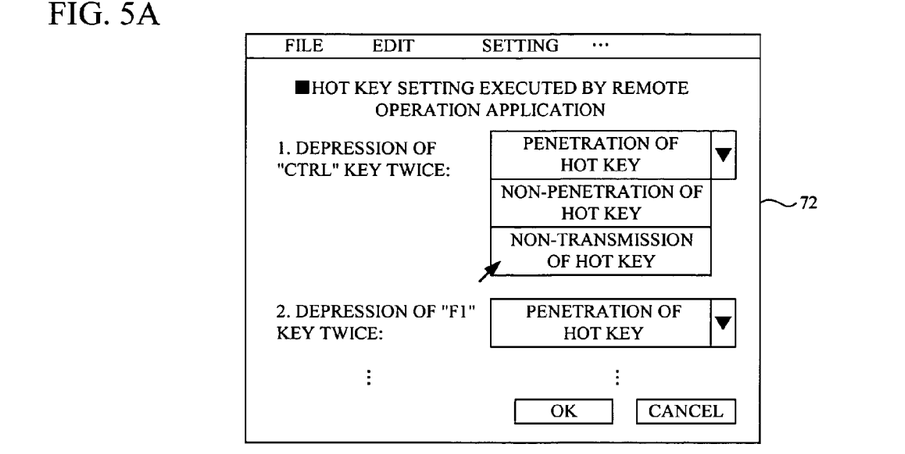
FIG. 5A is a diagram showing data for setting a mode of the hot key displayed on a window 72 when hot key setting 73 is selected.

When the hot key setting 73 is selected, the CPU 421 of the client 4 displays data for setting a mode of the hot key in FIG. 5A, on the window 72. When the hot key setting 74 is selected, the CPU 421 of the client 4 displays data for setting a mode of the hot key in FIG. 5B, on the window 72. The user may access the KVM switch 2 via the window 80 of the browser, and cause the window 80 to display the data for setting the mode of the hot key as shown in FIG. 5C.

Figure 5B:
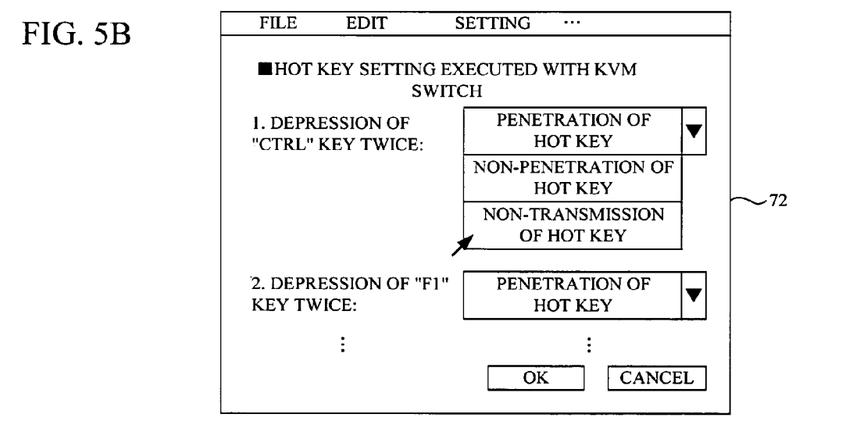
FIG. 5B is a diagram showing data for setting the mode of the hot key displayed on the window 72 when hot key setting 74 is selected.
Figure 5C:
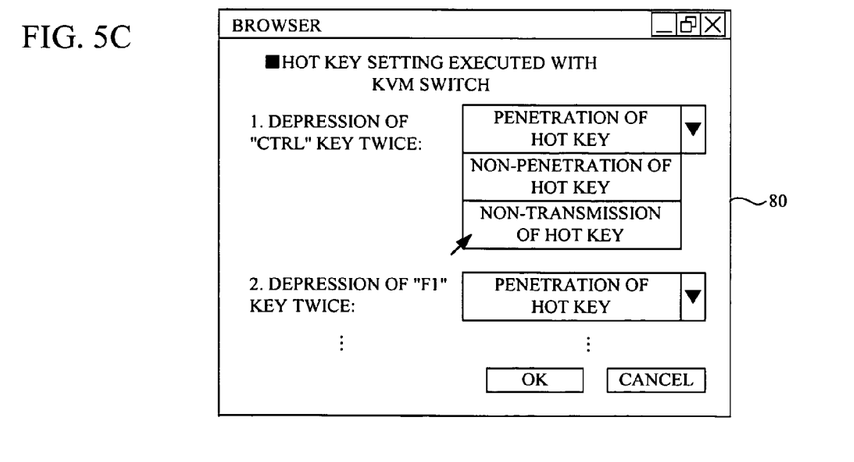
FIG. 5C is a diagram showing data for setting the mode of the hot key displayed on a window 80.

As shown in FIGS. 5A to 5C, "penetration of hot key", "non-penetration of hot key", and "non-transmission of hot key" are included in the mode of the hot key.

When the "penetration of hot key" is set as the mode of the hot key, even if the KVM switch 2 receives a packet including the corresponding hot key from the client 4, the KVM switch 2 transmits the packet to the server 1 without executing operation corresponding to the hot key. When the server 1 receives the packet, the server 1 executes the operation corresponding to the hot key.

When the "non-penetration of hot key" is set as the mode of the hot key, the KVM switch 2 receives the packet including the corresponding hot key from the client 4, and executes the operation corresponding to the hot key. At this time, the KVM switch 2 does not transmit the packet including the hot key to the server 1.

When the "non-transmission of hot key" is set to the client 4 as the mode of the hot key, the client 4 does not transmit the packet including the hot key to the KVM switch 2 and the server 1. When the "non-transmission of hot key" is set to the KVM switch 2 as the mode of the hot key, the KVM switch 2 does not transmit the packet including the hot key to the server 1, and does not execute the operation corresponding to the hot key.

The data on the mode of the hot key set in FIG. 5A is stored into the remote operation application 406 (specifically, the HDD 424). The data on the mode of the hot key set in FIGS. 5B and 5C is stored into the memory 204 of the KVM switch 2. To match the data on the mode of the hot key stored into the KVM switch 2 to the data on the mode of the hot key stored into the remote operation application 406, the data on the mode of the hot key stored into the KVM switch 2 is transmitted to the remote operation application 406. The remote operation application 406 updates the current data on the mode of the hot key according to the data on the mode of the hot key stored into the KVM switch 2. This makes it possible to reflect the mode of the hot key set by the KVM switch 2 in the client 4.

Figure 6:
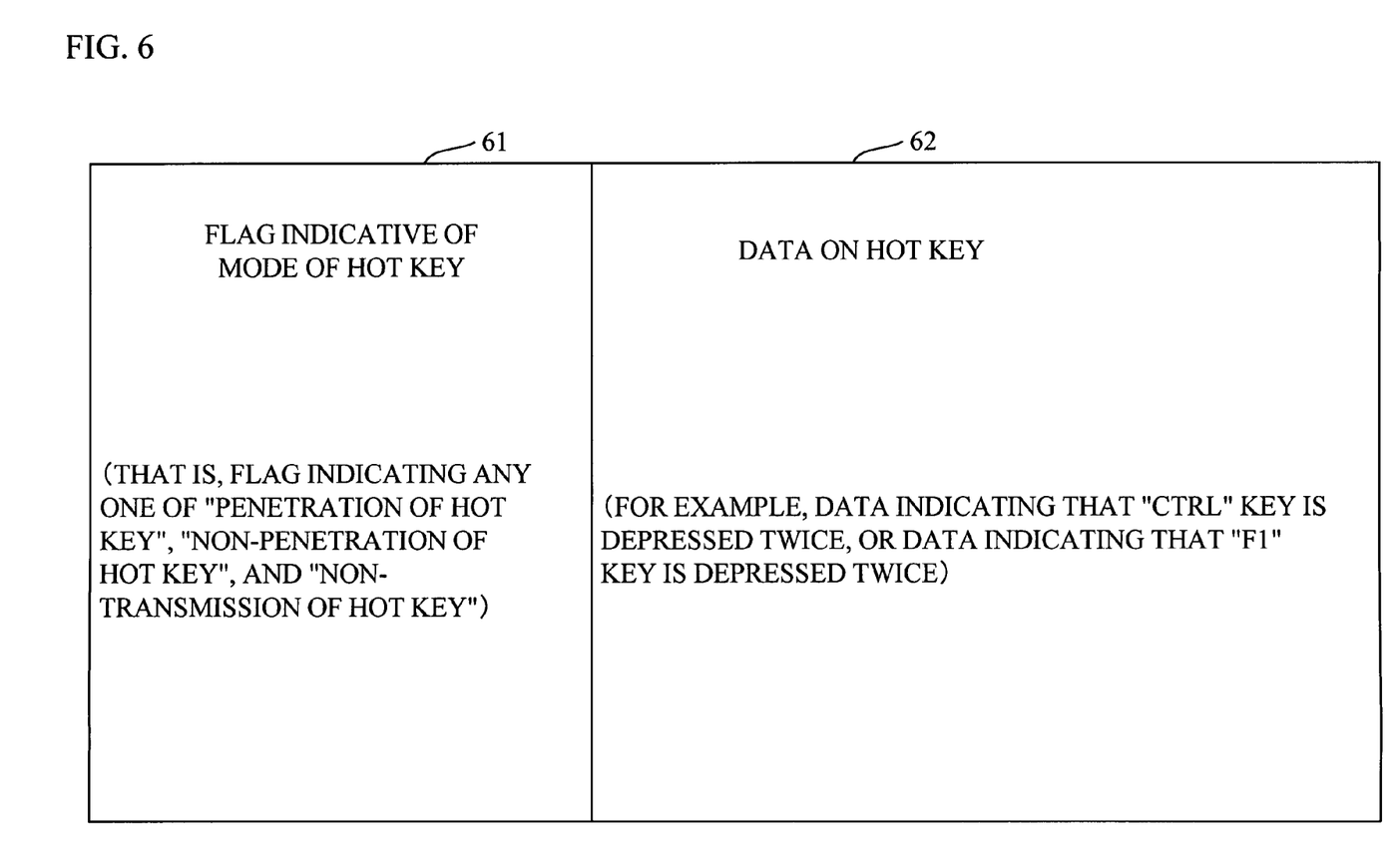
FIG. 6 is a block diagram showing the construction of a packet including the hot key.

FIG. 6 is a block diagram showing the construction of the packet including the hot key.

The packet including the hot key includes a flag 61 indicative of the mode of the hot key, and data 62 on the hot key. The flag 61 indicative of the mode of the hot key indicates any one of the "penetration of hot key", the "non-penetration of hot key", and the "non-transmission of hot key". The data 62 on the hot key is data indicating that the "ctrl" key is depressed twice, data indicating that the "F1" key is depressed twice, or the like.

Figure 7:
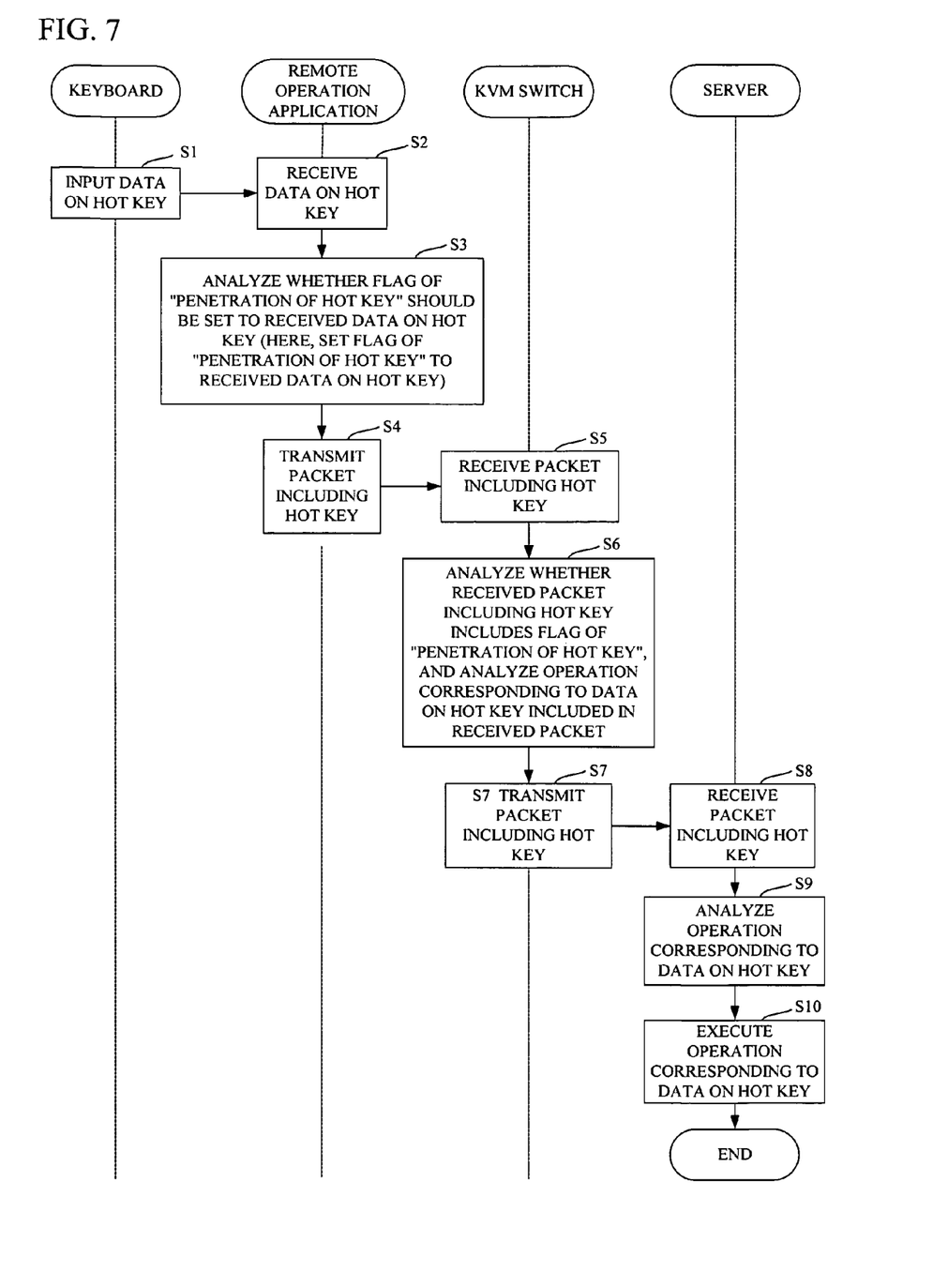
FIG. 7 is a flowchart showing a process executed with the remote system when "penetration of hot key" is set as the mode of the hot key.

FIG. 7 is a flowchart showing a process executed with the remote system when "penetration of hot key" is set as the mode of the hot key.

First, when the data on the hot key is input from the keyboard 5 of the client 4 (step S1), the remote operation application 406 receives the data on the hot key via the OS 405 (step S2).

The remote operation application 406 analyzes whether the flag of the "penetration of hot key" should be set to the received data on the hot key, based on the data on the mode of the hot key stored into the HDD 424 (step S3). For example, it is assumed that, when the "ctrl" key is depressed twice in FIG. 5A, the "non-penetration of hot key" is set. In this case, the remote operation application 406 sets the flag of the "non-penetration of hot key" to the received data on the hot key, as the procedure of step S3.

Here, the remote operation application 406 sets the flag of the "penetration of hot key" to the received data on the hot key.

The remote operation application 406 transmits the packet including the hot key to the KVM switch 2 (step S4).

The control unit 203 of the KVM switch 2 receives the packet including the hot key (step S5). The control unit 203 analyzes whether the received packet including the hot key includes the flag of the "penetration of hot key" based on the data on the mode of the hot key stored into the memory 204, and analyzes operation corresponding to the data on the hot key included in the received packet based on the table data in FIG. 3B (step S6). Here, since the flag of the "penetration of hot key" is included in the received packet, the control unit 203 transmits the packet including the hot key to the server 1 (step S7).

The CPU 121 of the server 1 receives the packet including the hot key (step S8). The CPU 121 analyzes operation corresponding to the data on the hot key based on the table data in FIG. 3A (step S9), and executes the operation corresponding to the data on the hot key (step S1). Then, the present process is terminated.

Figure 8:
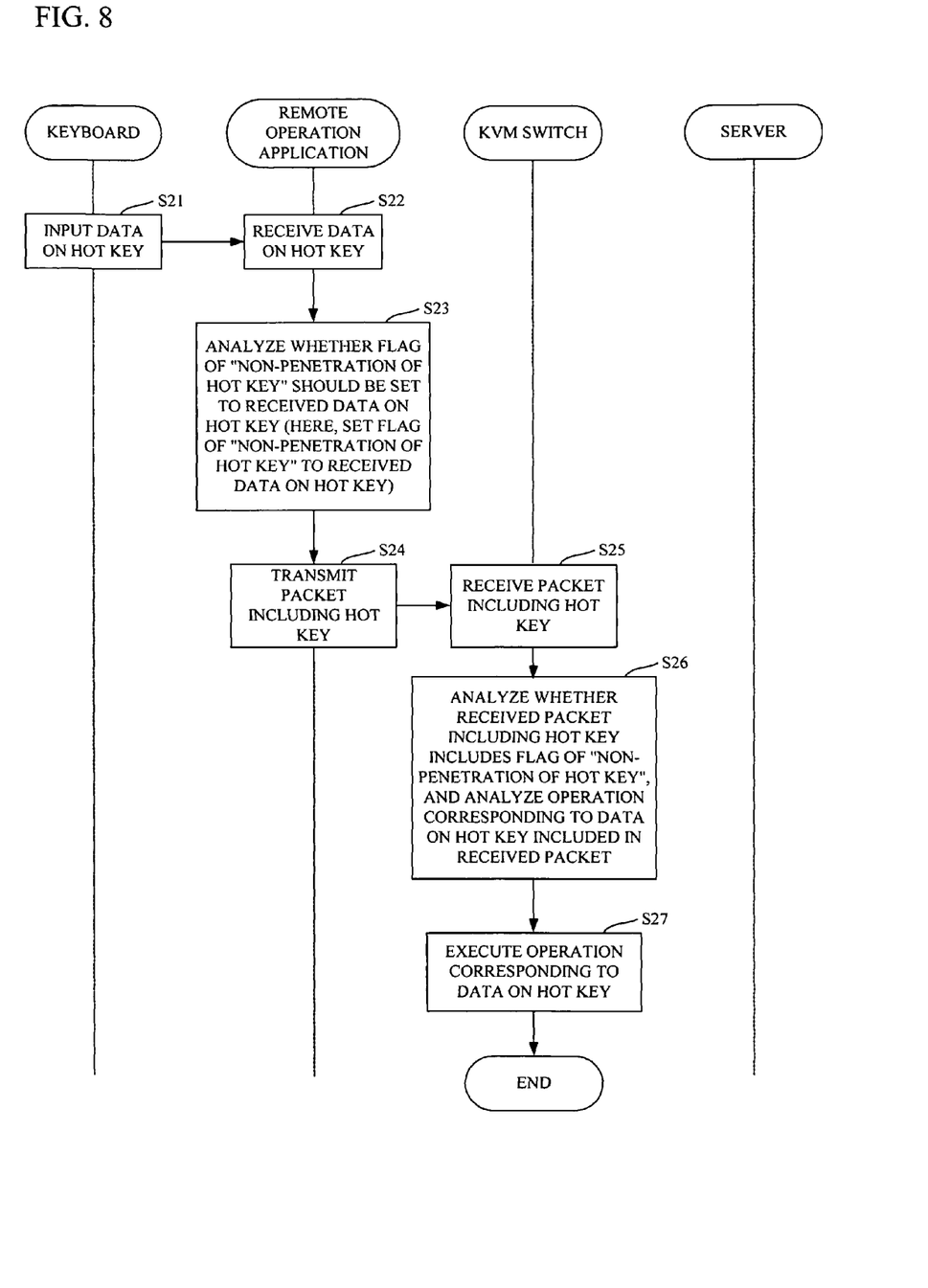
FIG. 8 is a flowchart showing a process executed with the remote system when "non-penetration of hot key" is set as the mode of the hot key.

FIG. 8 is a flowchart showing a process executed with the remote system when the "non-penetration of hot key" is set as the mode of the hot key.

When the data on the hot key is input from the keyboard 5 of the client 4 (step S21), the remote operation application 406 receives the data on the hot key via the OS 405 (step S22).

The remote operation application 406 analyzes whether the flag of the "non-penetration of hot key" should be set to the received data on the hot key, based on the data on the mode of the hot key stored into the HDD 424 (step S23). Here, the remote operation application 406 sets the flag of the "non-penetration of hot key" to the received data on the hot key.

The remote operation application 406 transmits the packet including the hot key to the KVM switch 2 (step S24).

The control unit 203 of the KVM switch 2 receives the packet including the hot key (step S25). The control unit 203 analyzes whether the received packet including the hot key includes the flag of the "non-penetration of hot key" based on the data on the mode of the hot key stored into the memory 204, and analyzes operation corresponding to the data on the hot key included in the received packet based on the table data in FIG. 3B (step S26). Here, since the flag of the "non-penetration of hot key" is included in the received packet, the control unit 203 executes the operation corresponding to the data on the hot key (step S27). Then, the present process is terminated.

Figure 9:
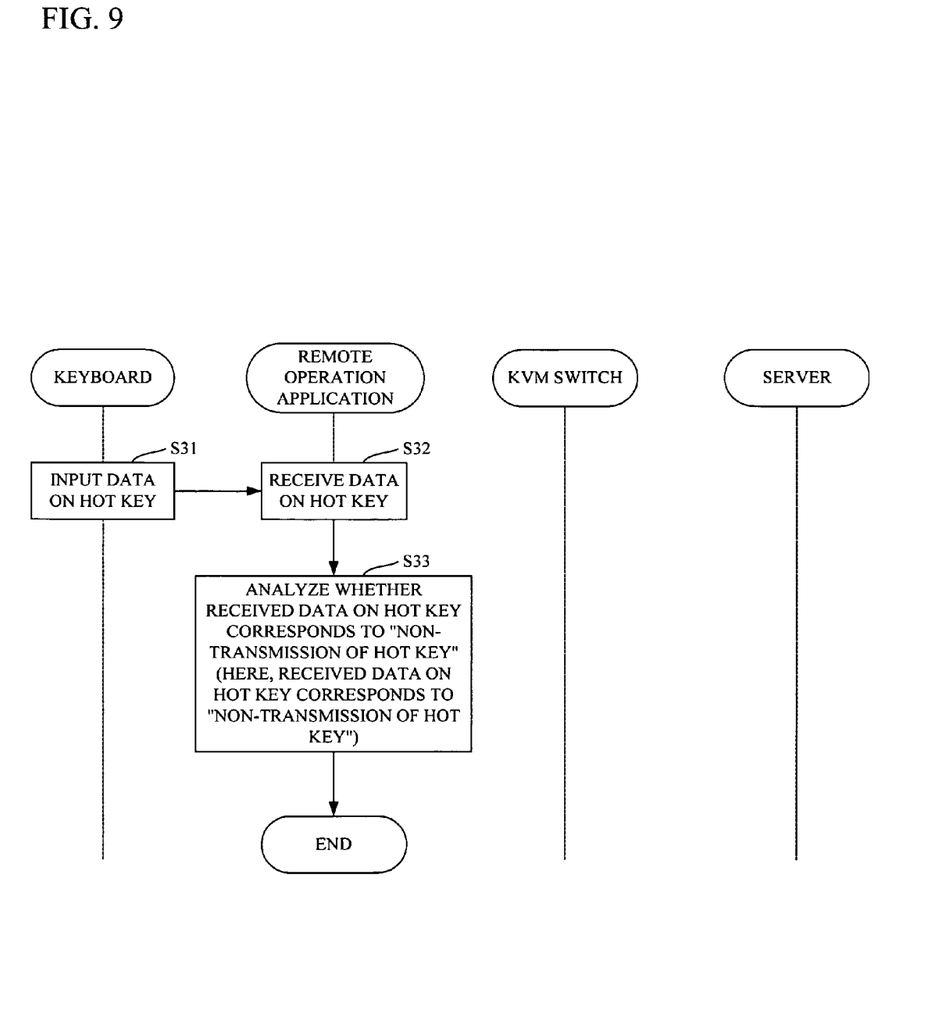
FIG. 9 is a flowchart showing a process executed with the remote system when a remote operation application 406 judges that "non-transmission of hot key" is set as the mode of the hot key.

FIG. 9 is a flowchart showing a process executed with the remote system when the remote operation application 406 judges that "non-transmission of hot key" is set as the mode of the hot key.

When the data on the hot key is input from the keyboard 5 of the client 4 (step S31), the remote operation application 406 receives the data on the hot key via the OS 405 (step S32).

The remote operation application 406 analyzes whether the received data on the hot key corresponds to the "non-transmission of hot key" based on the data on the mode of the hot key stored into the HDD 424 (step S33). Here, the remote operation application 406 judges that the received data on the hot key corresponds to the "non-transmission of hot key". The remote operation application 406 terminates the present process without transmitting the data on the hot key to the KVM switch 2.

Figure 10:
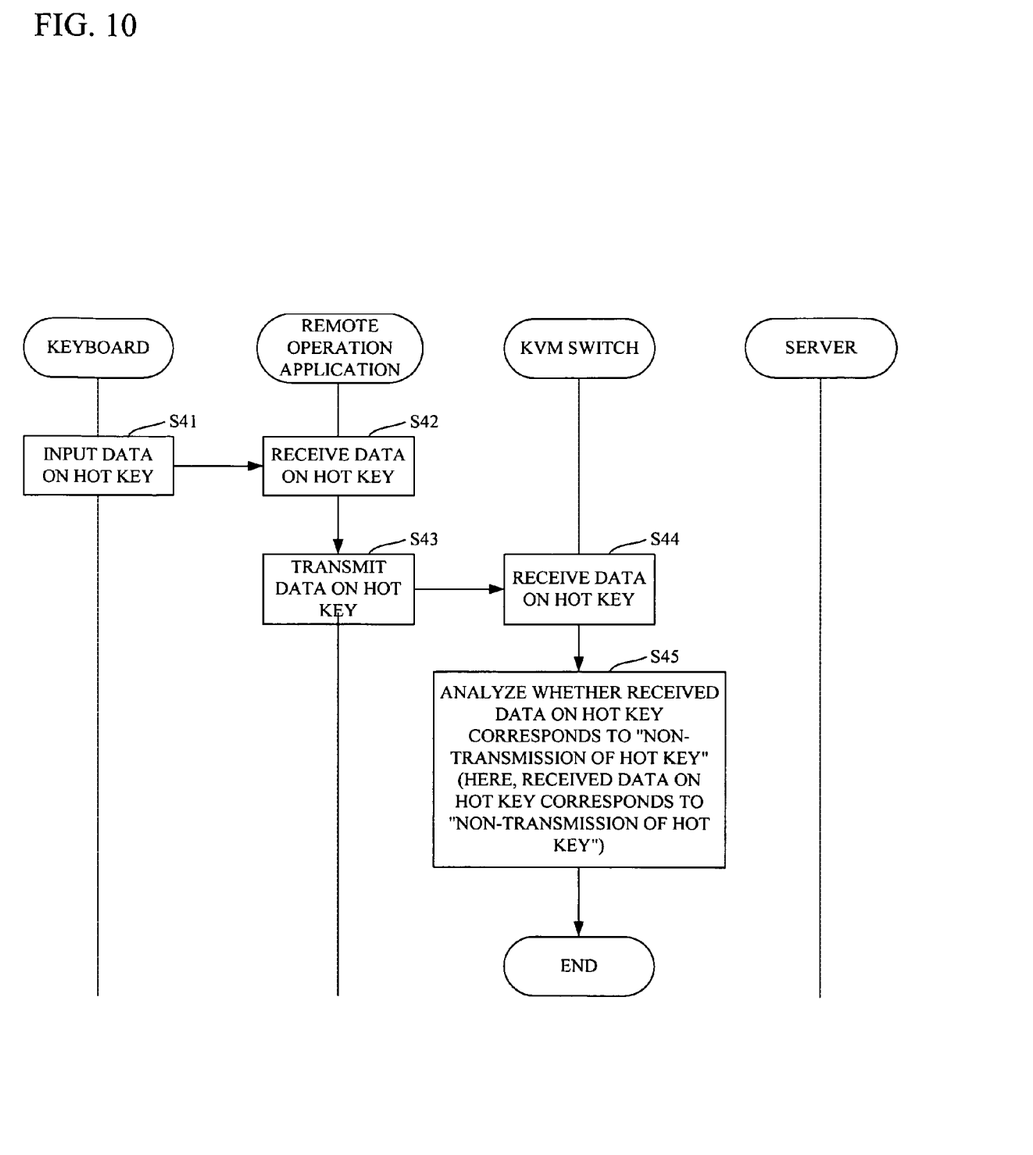
FIG. 10 is a flowchart showing a process executed with the remote system when the KVM switch 2 judges that "non-transmission of hot key" is set as the mode of the hot key.

FIG. 10 is a flowchart showing a process executed with the remote system when the KVM switch 2 judges that "non-transmission of hot key" is set as the mode of the hot key.

When the data on the hot key is input from the keyboard 5 of the client 4 (step S41), the remote operation application 406 receives the data on the hot key via the OS 405 (step S42).

The remote operation application 406 transmits the data on the hot key to the KVM switch 2 (step S43). The control unit 203 of the KVM switch 2 receives the data on the hot key (step S44). The control unit 203 analyzes whether the received data on the hot key corresponds to the "non-transmission of hot key" based on the data on the mode of the hot key stored into the memory 204 (step S45). Here, the control unit 203 judges that the received data on the hot key corresponds to the "non-transmission of hot key".

The remote operation application 406 terminates the present process without executing the operation depending on the data on the hot key, and transmitting the data on the hot key to the server 1.

As described in detail above, according to the present embodiment of the present invention, any one of the "penetration of hot key" (a first setting) that enables the data on the hot key from keyboard 5 for the server 1, the "non-penetration of hot key" (a second setting) that enables the data on the hot key from keyboard 5 for the KVM switch 2, and the "non-transmission of hot key" (a third setting) that disables the data on the hot key from keyboard 5 for both of the KVM switch 2 and the server 1 is selected by the remote operation application 406. When the "penetration of hot key" is selected, the CPU 421 transmits the data on the hot key and the flag indicative of the "penetration of hot key" to the server 1 via the KVM switch 2. When the "non-penetration of hot key" is selected, the CPU 421 transmits the data on the hot key and the flag indicative of the "non-penetration of hot key" to the KVM switch 2. When the "non-transmission of hot key" is selected, the CPU 421 does not transmit the data on the hot key to the KVM switch 2 and the server 1.

Therefore, the KVM switch 2 or the server 1 fails to execute the operation for which the user does not hope, and the usability of the hot key can be improved.

Also, any one of the "penetration of hot key" (a first setting) that enables the data on the hot key from keyboard 5 for the server 1, the "non-penetration of hot key" (a second setting) that enables the data on the hot key from keyboard 5 for the KVM switch 2, and the "non-transmission of hot key" (a third setting) that disables the data on the hot key from keyboard 5 for both of the KVM switch 2 and the server 1 is selected by the control unit 203 of the KVM switch 2. When the "penetration of hot key" is selected, the control unit 203 receives the data on the hot key and the flag indicative of the "penetration of hot key" from the client 4, and transmits the data on the hot key and the flag indicative of the "penetration of hot key" to the server 1. When the "non-penetration of hot key" is selected, the control unit 203 receives the data on the hot key and the flag indicative of the "non-penetration of hot key" from the client 4, and executes the operation corresponding to the data on the hot key. When the "non-transmission of hot key" is selected, the control unit 203 receives the data on the hot key from the client 4, and does not execute the operation corresponding to the data on the hot key and transmit the data on the hot key to the server 1.

Therefore, the KVM switch 2 or the server 1 fails to execute the operation for which the user does not hope, and the usability of the hot key can be improved.

A recording medium on which the software program for realizing the functions of the client 4 or the KVM switch 2 is recorded may be supplied to the client 4 or the KVM switch 2, and the CPU 421 or the control unit 203 may read and execute the program recorded on the recording medium. In this manner, the same effects as those of the above-described embodiment can be achieved. The recording medium for providing the program may be a CD-ROM, a DVD, or a SD card, for example.

Alternatively, the CPU 421 of the client 4 or the control unit 203 of the KVM switch 2 may execute a software program for realizing the functions of the client 4 or the KVM switch 2, so as to achieve the same effects as those of the above-described embodiment.

It should be noted that the present invention is not limited to those embodiments, and various modifications may be made to them without departing from the scope of the invention.

The Present application is based on Japanese Patent Application No. 2008-211234 filed Aug. 19, 2008, the entire disclosure of which is hereby incorporated by reference.

What is claimed is:

1. An information processing apparatus comprising:
    a selection portion that selects any one of a first setting that enables data on a hot key from a keyboard for a server, a second setting that enables the data on the hot key from the keyboard for a KVM switch, and a third setting that disables the data on the hot key from the keyboard for both of the KVM switch and the server, the information processing apparatus being connected to the server via the KVM switch, and connected to the keyboard; and
    a transmission portion that transmits the data on the hot key and a flag indicative of the first setting to the server via the KVM switch when the first setting is selected, transmits the data on the hot key and a flag indicative of the second setting to the KVM switch when the second setting is selected, and fails to transmit the data on the hot key to the KVM switch and the server when the third setting is selected.

2. The information processing apparatus as claimed in claim 1, further comprising a setting portion that sets any one of the first setting, the second setting, and the third setting to the KVM switch.

3. The information processing apparatus as claimed in claim 1, further comprising a reception portion that receives any one of the first setting, the second setting, and the third setting set by the KVM switch, and an update portion that updates the setting selected by the selection portion according to the setting received by the reception portion.

4. The information processing apparatus as claimed in claim 2, further comprising a reception portion that receives any one of the first setting, the second setting, and the third setting set by the KVM switch, and an update portion that updates the setting selected by the selection portion according to the setting received by the reception portion.

5. A KVM switch comprising:
    a selection portion that selects any one of a first setting that enables data on a hot key from an information processing apparatus for a server, a second setting that enables the data on the hot key from the information processing apparatus for the KVM switch, and a third setting that disables the data on the hot key from the information processing apparatus for both of the KVM switch and the server, the KVM switch being connected between the server and the information processing apparatus; and
    a control portion that receives the data on the hot key and a flag indicative of the first setting from the information processing apparatus and transmits the data on the hot key and the flag indicative of the first setting to the server when the first setting is selected, receives the data on the hot key and a flag indicative of the second setting from the information processing apparatus and executes operation corresponding to the data on the hot key when the second setting is selected, and receives the data on the hot key from the information processing apparatus and fails to execute operation corresponding to the data on the hot key and to transmit the data on the hot key to the server when third setting is selected.

6. The KVM switch as claimed in claim 5, wherein the selection portion selects any one of the first setting, the second setting, and the third setting depending on an instruction from the information processing apparatus.

7. A remote system including a server, an information processing apparatus, and a KVM switch connected between the server and the information processing apparatus and connected to a keyboard, wherein:
at least one of the information processing apparatus or the KVM switch comprises a selection portion that selects any one of a first setting that enables data on a hot key from a keyboard for a server, a second setting that enables the data on the hot key from the keyboard for a KVM switch, and a third setting that disables the data on the hot key from the keyboard for both of the KVM switch and the server, the information processing apparatus comprises a transmission portion that transmits the data on the hot key and a flag indicative of the first setting to the server via the KVM switch when the first setting is selected, transmits the data on the hot key and a flag indicative of the second setting to the KVM switch when the second setting is selected, and fails to transmit the data on the hot key to the KVM switch and the server when the third setting is selected, and the KVM switch comprises a control portion that receives the data on the hot key and a flag indicative of the first setting from the information processing apparatus and transmits the data on the hot key and the flag indicative of the first setting to the server when the first setting is selected, receives the data on the hot key and a flag indicative of the second setting from the information processing apparatus and executes operation corresponding to the data on the hot key when the second setting is selected, and receives the data on the hot key from the information processing apparatus and fails to execute operation corresponding to the data on the hot key and to transmit the data on the hot key to the server when third setting is selected.

8. The remote system as claimed in claim 7, wherein when each of the information processing apparatus or the KVM switch comprises the selection portion, the setting selected by the selection portion included in the information processing apparatus is updated according to the setting selected by the selection portion included in the KVM switch.

9. A computer readable storage medium causing a computer to execute a process, the process comprising:
selecting any one of a first setting that enables data on a hot key from a keyboard for a server, a second setting that enables the data on the hot key from the keyboard for a KVM switch, and a third setting that disables the data on the hot key from the keyboard for both of the KVM switch and the server, the information processing apparatus being connected to the server via the KVM switch, and connected to the keyboard;
transmitting the data on the hot key and a flag indicative of the first setting to the server via the KVM switch when the first setting is selected;
transmitting the data on the hot key and a flag indicative of the second setting to the KVM switch when the second setting is selected; and
failing to transmit the data on the hot key to the KVM switch and the server when the third setting is selected.

10. A computer readable storage medium causing a KVM switch to execute a process, the process comprising:
selecting any one of a first setting that enables data on a hot key from an information processing apparatus for a server, a second setting that enables the data on the hot key from the information processing apparatus for the KVM switch, and a third setting that disables the data on the hot key from the information processing apparatus for both of the KVM switch and the server, the KVM switch being connected between the server and the information processing apparatus;
receiving the data on the hot key and a flag indicative of the first setting from the information processing apparatus and transmitting the data on the hot key and the flag indicative of the first setting to the server when the first setting is selected;
receiving the data on the hot key and a flag indicative of the second setting from the information processing apparatus and executing operation corresponding to the data on the hot key when the second setting is selected; and
receiving the data on the hot key from the information processing apparatus and failing to execute operation corresponding to the data on the hot key and to transmit the data on the hot key to the server when third setting is selected.

\* \* \* \* \*